Dec. 29, 1936.   J. A. SPENCER   2,066,162
THERMOSTATIC CONTROL
Original Filed Oct. 14, 1932

John A. Spencer,
Inventor.
Delos G. Haynes,
Attorney.

Patented Dec. 29, 1936

2,066,162

UNITED STATES PATENT OFFICE 2,066,162

THERMOSTATIC CONTROL

John A. Spencer, Newtonville, Mass., assignor to General Plate Company, Attleboro, Mass., a corporation of Massachusetts Original application October 14, 1932, Serial No. 637,854. Divided and this application August 27, 1934, Serial No. 741,547

4 Claims. (Cl. 236—48)

This invention relates to controls, and with regard to certain more specific features, to thermostatic controls.

This invention is a division of the invention disclosed in my copending United States patent application, Serial Number 637,854, filed October 14, 1932, for Thermostatic control, now Patent No. 1,972,832, granted September 4, 1934.

Among the several objects of the invention may be noted the provision of a thermostatic control having improved adjusting features, whereby the temperature operating differential may be closely adjusted, and having further adjusting features whereby the range of temperature operation may be varied; the provision of a control of the class described adapted for fluid valve use; and the provision of a thermostatic control of the class described which is compact and relatively simple in construction and operation. Other objects will be in part obvious and in part pointed out hereinafter.

The invention accordingly comprises the elements and combination of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a side elevation of the device applied to a valve;

Similar reference characters indicate corresponding parts throughout the several views of the drawing.

Figure 1:
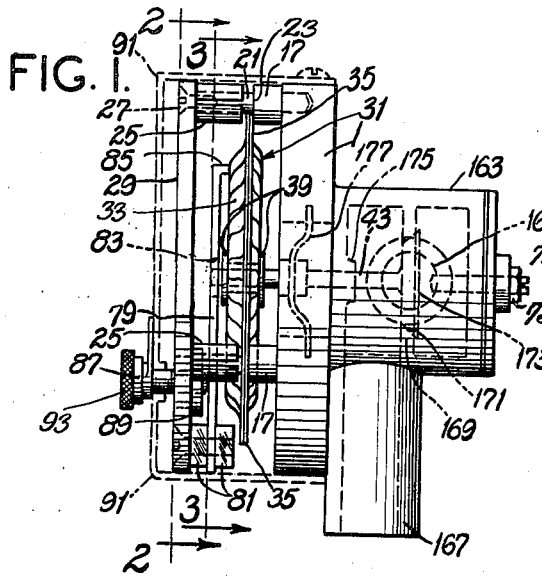

In my Patent No. 1,895,591, granted January 31, 1933, I have shown an improved form of thermostat, which, for its size, has a greatly increased throw or travel between its "cold" and "hot" positions, and has improved thermal-response characteristics. It is a principal object of the present invention to embody, or provide for the embodiment of, such improved thermostat in a thermostatic control, particularly such as a valve control. To this end, it is desirable, first, that the operating differential of the thermostatic switch be reduced to a minimum, second, that there be no considerable lag between the temperature to be controlled and the temperature of the thermostat, and, third, that the thermostat be capable of adjustment whereby it operates at any desired temperature. The invention as hereinafter described meets all of these requirements, and in addition presents numerous other advantages.

Referring now more particularly to the drawing herein, numeral 1 indicates a base-board, mounting panel, or the like, upon which the invention is assembled.

Figure 4:
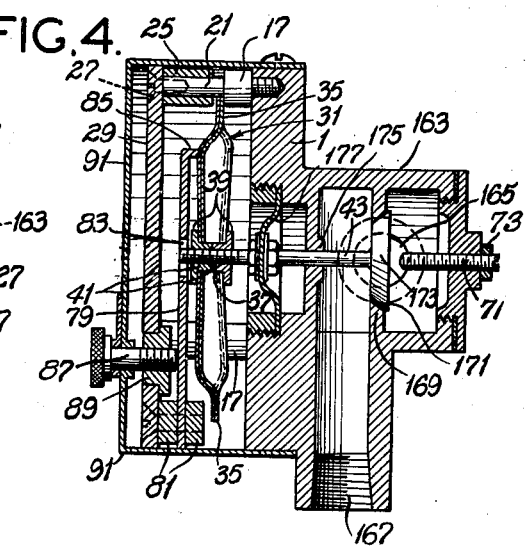
Fig. 4 is a vertical section taken substantially along line 4—4 of Fig. 3.

Numeral 31 indicates a thermostatic element of the type disclosed and claimed in my said Patent No. 1,895,591. It comprises a disc of thermostatic metal (usually bimetal), the central portion of which is radially corrugated, as indicated at numeral 33, but the edge portion 35 whereof is flat or flattened. A central opening 37 is provided in the corrugated region 33 (Fig. 4). The disc as a whole is normally dished, or made slightly conical, in one direction.

While a corrugated thermostatic disc of the type disclosed is preferred, and has numerous advantages not found elsewhere, a non-corrugated snap acting thermostatic disc of the type shown in my Patent No. 1,448,240 is also operative.

The action of the thermostat 31 is such, that as temperature change occurs, past a predetermined value, the direction of curvature of the disc reverses itself with a snap. The fact is that when the temperature is rising, the snapping temperature is higher, for the same thermostat, than the snapping temperature when the temperature is falling, the difference being termed the operating differential. For example, in the heating phase, a thermostat snaps from cold to hot position at 85° F., while the same thermostat, in the cooling phase, snaps from hot to cold position at 80° F., the difference (85°—80°=5°) being known as the operating differential of the particular thermostat.

The thermostat 31 is mounted on the columns 17, by its flat edge portion 35 abutting and being clamped against shoulders 23 by collars 25 which slip on a reduced-diameter portion 21 of the columns 17, and screws 27, which hold the collars 25 in position. This leaves the central portion 33 of the thermostat free to snap into its two opposite positions of curvature with temperature changes.

A pair of nuts 39 having cylindrical portions 41 extending into each side of the opening 37 of disc 31 are threaded on a shaft 43 extending transversely of the general plane of the thermostat. The nuts 39, while for all pratical purposes mechanically interconnecting shaft 43 and thermostat 31, are provided with the suitably sized cylindrical portions 41 so that they may be drawn tightly together, but at the same time allow sufficient freedom to the thermostat so as not to alter its operating characteristics.

Numeral 163 indicates a valve casing, provided with the customary inlet port 165, outlet port 167, partition 169, and valve seat 171. A valve closure 173 is supported on the stem or shaft 43 of the thermostatic control, passing through a sliding-bearing 175 in casing 163. A sealing diaphragm 177 (or, alternatively, a bellows) is desirably provided to make the valve compartment fluid-tight at the thermostat connection. The closure 173 is seated and unseated from the seat 171 as the thermostatic element snaps.

The thermostat 31 is subject to two adjustments: first, the adjustment of the operating differential, and, second, the adjustment of the temperature of operation, independently of the differential.

The differential adjustment is primarily effected by means designed to limit the extent of thermostatic movement, or throw, of the disc 31. In the present embodiment, movement limitation in one direction (to the left) is secured by the seating of valve closure 173 on valve seat 171. Adjustment may be effected by changing the positions of nuts 39 on shaft 43. Movement limitation in the other direction (to the right) is secured by an adjustable screw 71 and lock nut 73 mounted as an abutment for valve closure 173 moving in its non-seating direction. This primary differential control is usually a matter of factory adjustment, so no manually adjusting means are ordinarily provided on the exterior of the valve.

The temperature adjustment is effected by means of a spring lever 79, rigidly secured at one end in clamping blocks 81 held on the back-side of face plate 29. The lever 79 extends across the center of thermostat 31 (a hole 83 being provided to clear shaft 43 and/or screw 73), to engage the top face of thermostat 31 with a bent-over edge 85. Edge 85 engages the thermostat 31 at a point relatively near to the edge of the corrugated region 33. Engaging the lever 79 near its mounted end is a screw 87, borne in a suitable bushing 89 on face plate 29. By advancing the screw 87 inwardly, the lever is flexed against the thermostat, and, increasing the resilient pressure brought to bear on the face of thermostatic disc 31.

A cover 91 (Figs. 1 and 2) is desirably provided for the assembly. However, the screw 87 projects through cover 91 and is provided with a knob 93 having a pointer, which juxtaposes a suitable temperature scale formed on cover 91.

Figure 2:
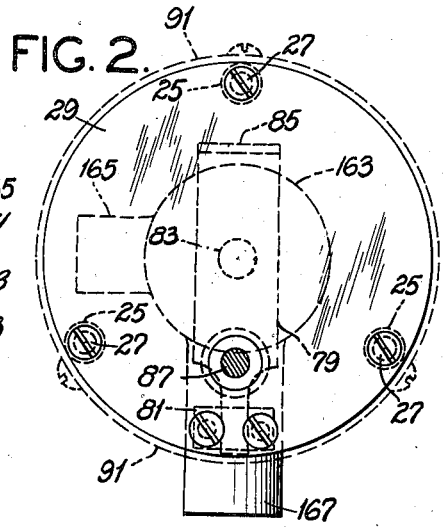
Fig. 2 is a vertical section taken on line 2—2 of Fig. 1.
Figure 3:
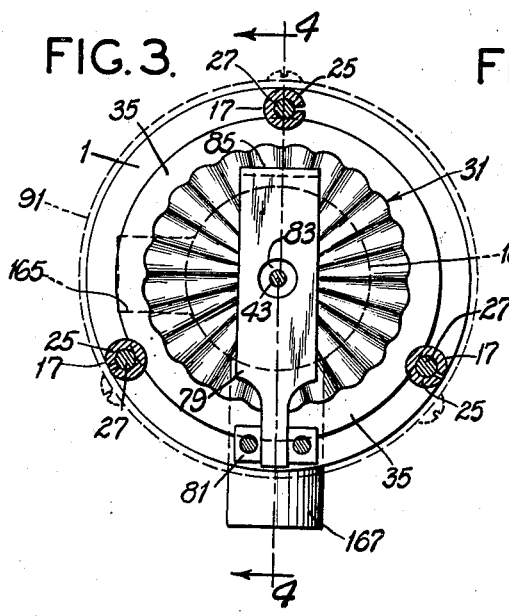
Fig. 3 is a vertical section taken on line 3—3 of Fig. 1.

The operation of the device is as follows:

Assuming that the thermostat 31 is in its hot position when dished outwardly as in Figures 1 and 4, the valve is then closed. The operating differential is now adjusted, preferably at the factory, by adjusting nuts 39 on shaft 43, and adjusting the position of abutment screw 71, thus altering the extent of dishing of the thermostatic disc, or by the method hereinafter described.

For example, with a thermostatic disc 1½" in diameter, made of 0.015" thick bimetal (low expansion member 36% nickel steel; high expansion member, nickel-chromium steel having 22% nickel and 3% chromium), upon careful adjustment the differential may be reduced to a total of 1° F., which is quite small enough to be unnoticeable in household use.

The temperature adjusting means, comprising the spring lever 79, screw 87, etc., is next adjusted.

The position and flexibility of the spring lever 79 are important. When these are correct, the force exerted by the lever 79 will control the operating temperature successfully over a wide range, for example, from 50° F. to 90° F. If, however, the lever is too stiff, or if its point of contact with the thermostatic disc 31 is too near the center of said disc, its tendency will be to make the disc creep rather than to move with the desired snap action. If the lever 79 is too flexible, or if its point of contact with the thermostatic disc 31 is too near the periphery of said disc, its tendency will be to increase the operating differential to an undue extent. In connection with a thermostatic disc 1½" in diameter, a lever of spring steel of 0.025" thickness and the general shape and size indicated, relatively, in the drawing has been found satisfactory. Final adjustment of the point of contact of lever 79 with thermostat 31 may be effected by moving said lever in and out of clamping blocks 81. This adjustment likewise comprises an adjustment of the operating differential of the disc, as the closer the point of contact of the lever 79 with the disc is brought to the periphery of the disc, the greater will be the operating differential, as indicated above. This adjustment frequently constitutes the final, accurate factory adjustment of the operating differential. However, this movement of the lever 79 in and out of the blocks 81 is not to be confused with the adjustment of the tension of the lever by operation of the knob 93, for the purpose of adjusting the operating temperature of the disc.

The spring lever 79 in reality has two functions. First, it adjusts the operating temperature (that is, it adjusts the temperature at which the device operates). Second, it effects a reduction of the differential per se, independently of the temperature of operation. This latter effect is secured by reason of the fact that the force exerted by the spring lever 79 upon the thermostat 31, when the valve is closed is greater, for a given setting of screw 87, than when the valve is in open position. The increment of force exerted by the spring lever, which comes into action when the thermostatic disc snaps, is always in such a direction as to oppose the motion, or, in other words, to favor the reverse motion. The reverse motion will therefore occur with a lesser temperature change than would be necessary were this increment absent, and hence the differential is reduced.

As has been indicated, upon suitable temperature change the thermostatic disc 31 reverses its curvature with a snap. Assuming that the reversal takes place from valve closed position represented in Fig. 4 to valve open position, the moving central portion of the thermostatic disc 31 carries with it, by axial movement, the central shaft 43.

It will be noted that the valve closure is secured to, and spaced from, the center of the thermostatic disc, which is the region of the said thermostatic disc undergoing the greatest amplitude of movement at the time of snapping. The thermostatic disc is supported at spaced points around its periphery, whereby opportunity is afforded for free, unimpeded circulation of the ambient medium, whereby more accurate and rapid response to ambient temperature conditions is assured. In connection with the last point, however, it is to be noted that the invention is readily workable, even though circular peripheral clamps be used to mount the thermostatic disc.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. Control means comprising a snap-acting thermostatic disc, means mounting said disc but leaving a portion thereof free for thermostatic movement, and means controlling the operating temperature of said thermostatic disc comprising a resilient element bearing upon at least one point on the surface of said disc, said point being located between the central portion and the periphery of said disc, and means controlling the operating differential of said disc comprising means for adjusting the position of said point between the central portion and the periphery of said disc.

2. Control means comprising a radially corrugated snap-acting thermostatic disc, means mounting said disc but leaving a portion thereof free for thermostatic movement and means controlling the operating temperature of said thermostatic disc comprising a resilient element bearing upon at least one point on the surface of said disc, said point being located between the central portion and the periphery of said disc, and means controlling the operating differential of said disc comprising means for adjusting the position of said point between the central portion and the periphery of said disc.

3. A thermostatically controlled valve comprising a valve casing having inlet and outlet ports, and a valve seat between said ports, a valve closure element adapted to seat upon said valve seat, a radially corrugated, snap-acting thermostatic disc mounted at its periphery, and means interconnecting the central portion of said disc and said closure element, means controlling the operating temperature of said thermostatic disc comprising a resilient element bearing upon at least one point on the surface of said disc, said point being located between the central portion and the periphery of said disc, and means controlling the operating differential of said disc comprising means for adjusting the position of said point between the central portion and the periphery of said disc.

4. A thermostatically controlled valve comprising a valve casing having inlet and outlet ports, and a valve seat between said ports, a valve closure element adapted to seat upon said valve seat, a radially corrugated, snap-acting thermostatic disc mounted at its periphery, and means interconnecting the central portion of said disc and said closure element, and means controlling the operating differential of said disc comprising means adjusting the interconnection of said disc and said closure element, whereby seating of said closure element on said valve seat limits movement of said disc in one direction, and an adjustable abutment for said closure element when moving in a non-seating direction, thereby limiting the movement of the disc in the other direction.

JOHN A. SPENCER.